United States Patent [19]

Warren

[11] 4,025,959
[45] May 24, 1977

[54] RECORDER-REPRODUCER SYSTEM

[75] Inventor: Henry Ray Warren, Indianapolis, Ind.

[73] Assignee: RCA Corporation, New York, N.Y.

[22] Filed: Sept. 29, 1975

[21] Appl. No.: 617,611

Related U.S. Application Data

[63] Continuation of Ser. No. 372,002, June 21, 1973, abandoned, which is a continuation of Ser. No. 172,015, Aug. 16, 1971, abandoned.

[30] Foreign Application Priority Data

| May 16, 1971 | United Kingdom | 6969/71 |
| Apr. 5, 1971 | United Kingdom | 8688/71 |

[52] U.S. Cl. .................................. 360/85; 360/132
[51] Int. Cl.² ................ G11B 15/24; G11B 15/62; G11B 15/66; G11B 23/04
[58] Field of Search ................... 360/81, 83, 84, 85, 360/93, 96, 132

[56] References Cited

UNITED STATES PATENTS

| 2,457,699 | 12/1948 | Marsen | 360/81 |
| 3,213,204 | 10/1965 | Okamura | 360/84 |
| 3,540,738 | 11/1970 | Yamamoto | 360/93 |
| 3,588,378 | 6/1971 | Protas et al. | 360/85 |
| 3,665,114 | 5/1972 | Hathaway | 360/85 |
| 3,697,676 | 10/1972 | Protas | 360/84 |
| 3,706,979 | 12/1972 | Tagawa et al. | 360/93 |

OTHER PUBLICATIONS

IBM Tech. Disclosure Bulletin, vol. 9, No. 6, p. 576, 1966.

Primary Examiner—Raymond F. Cardillo, Jr.
Attorney, Agent, or Firm—E. M. Whitacre; M. DeCamillis

[57] ABSTRACT

A transport-scanner assembly is provided with a cantilevered truncated arcuate surface adapted to support and guide a recording web, while the web is scanned for information transducing. The web extends between a pair of reels in a cartridge, which is movably mounted to interface with the arcuate surface of the transport scanner assembly through a movable wall of the cartridge. In this condition, the arcuate surface of the scanner is interposed within and between the walls of the cartridge, with the web being transported and scanned within the recess of the cartridge.

12 Claims, 8 Drawing Figures

INVENTOR.
Henry Ray Warren
BY James B. Hayes
ATTORNEY

INVENTOR.
Henry Ray Warren
BY
James B. Hayes
ATTORNEY

RECORDER-REPRODUCER SYSTEM

This is a continuation of application Ser. No. 372,002 filed June 21, 1973, now abandoned, which was a continuation of application Ser. No. 172,015, filed Aug. 16, 1971, now abandoned.

This invention relates to a scanning transducer recorder reproducer system for transducing information signals with a web like record medium extending between a pair of reels which are enclosed in a tape cartridge or cassette.

A wide variety of cartridges and systems designed to handle web-like record material exist. A well known arrangement utilized in audio systems, includes a cartridge wherein the tape is translated longitudinally along an open boundary of the cartridge past a stationary transducing head. In such an arrangement the record medium or tape is vulnerable to contamination and/or damage during operation or when being handled and stored. Such a longitudinal recorder playback format is suitable for audio tape information where lower head to tape speeds are tolerable. However, in video systems the appreciably greater head to tape speeds required have dictated the use of alternative approaches such as the transverse type of helical scan and quadruplex recorder reproducer systems. Generally such transverse type systems like the early audio systems are of the so called reel to reel type. The tape which is threaded through the transport path is secured at its respective ends to separately arranged supply and take up reels.

The recognized success of a cartridge or cassette approach in audio systems has motivated attempts to provide similar approaches for video tape systems. However, as noted, video systems require a rapid scanning of the record medium by one or a number of movable transducer heads. This therefore poses a formidable problem.

The carryover of the cartridge approach is particularly attractive in video systems, since contamination and damage to video record mediums due to handling, storage, etc. produces much less tolerable effects of noise and distortion on the eye of the observer of the visual end product.

Enclosing the video record medium in a cartridge or cassette solves part of the problem by minimizing contamination and damage. However, there is the requirement of manually threading or otherwise disposing the video record medium in a transport to facilitate the necessary high speed scanning of the medium by the moving transducers.

Prior art approaches to solving this two fold problem include, a cartridge enclosing a single reel of tape where the video record medium is withdrawn from the cartridge and either manually or automatically end threaded through the transport to an empty take-up-reel. Other systems utilize a coplanar two reel cartridge wherein access to the tape record medium is provided for withdrawing the tape medium to dispose it in the scanner transport path by either manual or automatic means. Further systems employ an approach, similar to audio systems, of shaping the cartridge to permit scanning of an exposed segment of the record web along a portion of the boundary of the cartridge.

With the arrangement of the present invention these problems are solved in the most advantageous manner. The disclosed arrangement enables the video record medium to be scanned without removing it from its protective cartridge. The scanning is provided in a novel manner, enabling the use of a small uncomplicated enclosing cartridge, which is simple and economical to fabricate. No removal of the tape medium for threading is required, hereby eliminating complex and costly hardware. The cartridge may be relatively thin and of small volume facilitating ease of handling and storage and nnot unnecesarily increasing the size of the recorder reproducer system in which it operates.

These and other advantages are realized in accordance with the present invention by provision of a transducer head scanner which is arranged to extend into the cartridge and scan the video record medium. The head scanner, which includes a slotted guide surface in which the transducer are swept, is shaped for interposition between the walls of the cartridge to establish an interface with the medium within the boundaries of the cartridge. The video record medium remains within its surrounding protective cartridge, while it is scanned during transport between a pair of substantially co-planar mounted rotatable reels.

Since the breath of the transducer head scanner is made substantially comparable to the tape width, the cartridge is of regular and simplified shape. Complete enclosure and convenient access to the record medium is provided by an uncomplicated movable side wall of the cartridge.

The size compatibility of the scanner and cartridge avoids interference problem between the scanner and movable wall of the cartridge when they are interleaved for scanning, offers a more compact space savings arrangement and therefore an overall simplified system of reduced volume.

REFERRING TO THE DRAWING

Figure 1:
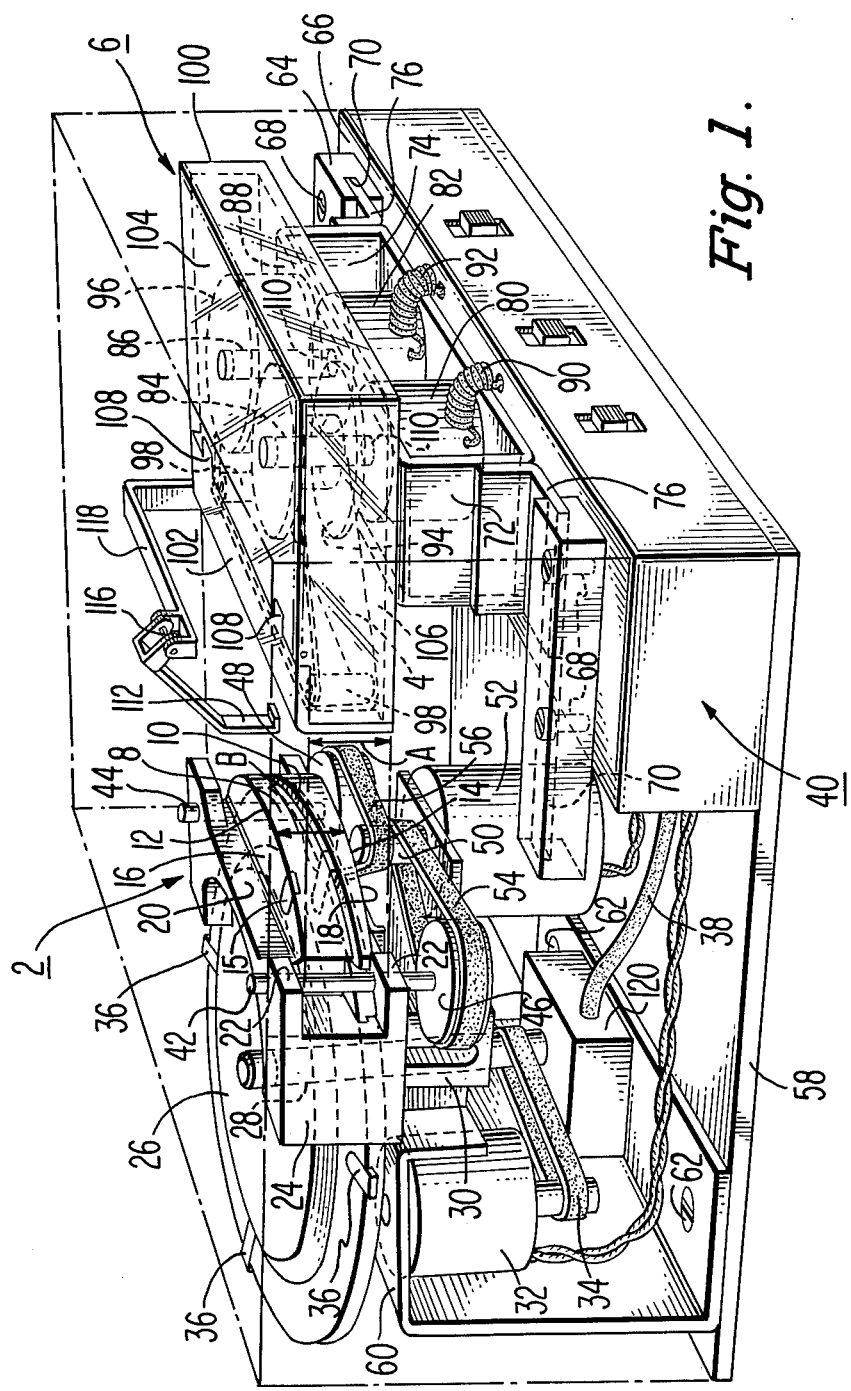
FIG. 1 is a perspective view of a recorder reproducer system embodying the invention, wherein elements thereof are shown in a first relative position of an operating sequence.

In FIG. 1 there is shown a recorder reproducer system including a tranport-scanner assembly 2, for transducing information with a web like record medium 4, such as a tape, which is disposed within a cartridge assembly 6. The transport-scanner assembly 2 includes an arcuate guide surface 8 having a narrow slot 10 therethrough which extends along and diagonally across the surface 8 between edges 12 and 14 thereof. A stationary transducer 15 which may be utilized for example for audio or control information, is mounted in the peripheral surface of the web guide surface 8. The surface 8 is preferably a truncated arcuate segment or sector of a cylinder with the truncated top and bottom portions 16 and 18 separated by a width, which is approximately equal to the width of the recording web 4. The surface 8 is supported in cantilevered manner between the recessed portions 20 of flanges 22 of a generally U-shaped support member 24.

Figure 4:
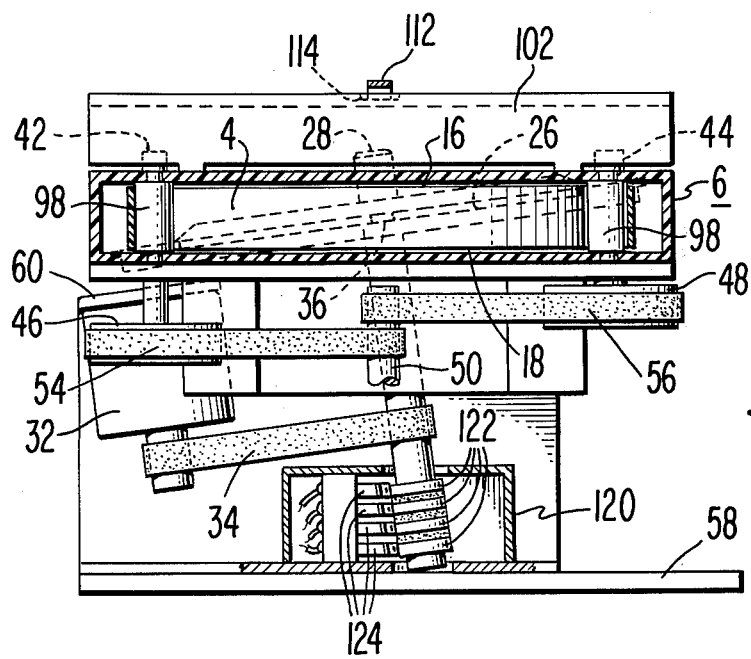
FIG. 4 is a view in section along the line 1—1 of FIG. 3.

A substantially planar disc or headwheel 26 having a shaft 28 is rotatably mounted through portion 30 of the support member 24 for rotation of the disc 26 through the slot 10. The shaft 28 of the disc or headwheel 26 is driven by motor means 32 through a belt 34. Mounted about the periphery of the disc 26 at approximately equally spaced intervals are a plurality of transducers 36. Where the recording web is a magnetic tape, the transducers 36 are one of the many known, suitable types of magnetic head transducers. The transducers 36 are arranged on the periphery of the disc 26 to protrude a small distance beyond the surface 8 in the slot 10. Signal information may be fed to and derived from the rotating transducers 36 by any one of a number of techniques well known in the art. One such arrangement, using slip rings on the rotatable shaft 28 of the headwheel 26 which cooperate with sliding contacts on a stationary member, is shown in FIG. 4. The electrical signals of the transducers 36 are intercoupled by suitable wiring with an electrical unit 40. The electrical unit 40 contains well known suitable types of circuitry for performing the functions of control, energization and signal processing for the recorder-reproducer system.

Respective ones of a pair of recording web driving members or capstan 42 and 44 are disposed at each end of the arcuate web guide surface 8. The capstans may be thought of as lying on a cord of the arc of the surface 8 where the cord intersects the arc. The capstans 42 and 44 are rotatably mounted in suitable holes provided in the flanges 22 of the generally U shaped support member 24. Drive pulleys 46 and 48 are coupled to one end of the respective capstans 42 and 44. The pulleys 46 and 48 are driven from the shaft 50 of motor means 52 by suitable belt means 54 and 56. The motor means 52 as well as the disc drive motor 32 are energized, as indicated from, the electrical unit 40. In operation of the invention, assuming the web 4 is to be achieved from the capstan 42 towards the capstan 44 over the surface 8, the velocity of the capstan 44 although in the same direction is made slightly greater than the velocity of the capstan 42. This may be accomplished for example, by providing a drive pulley 48 whose diameter is less than the diameter of the drive pulley 46. This differential velocity provides desired tension of the web 4 when transported over the surface 8. Since web tension is significant on the surface 8 for purposes of accurate tracking by the transducers 36, providing web tension in this manner allows a simplified, non-critical and less costly arrangement to be used for control of supply and take-up means for the web 4. That is, the dual capstan drive provides isolation of the web portion on the surface 8, from the perturbations experienced by the balance of the web during transport between the supply and take-up means.

In practice of the invention, it is advantageous to provide the mounting and support portions of the member 24 for the headwheel shaft 28, capstan 42 and 44, and the cantilevered arcuate guide surface 8, as unified projections or extensions of a single piece of material. This is accomplished by casting a suitable material, such as aluminum, in the form generally shown and described for the support member 24. Following casting, the slot 10, and shaft receiving holes for the capstans 42, 44 and the headwheel shaft 28 may be machined in a single machining operation. In this way the relative spacing and tolerances among the slot 10, capstans 42, 44 and headwheel shaft 28 may be established and maintained in very arcuate fixed relation with one another.

The transport scanner assembly 2 is coupled to a base member 58, by means of a bracket 60 which is secured to the base by suitable means such as screws 62. Also secured to the base member 58 is the electrical unit 40. A pair of guide members 64 are secured to the top surface 66 of the electrical unit 40, by suitable means such as screws 68. As shown, the guide members 64 extend in the direction towards the transport assembly 2. Each of the guide members 64 includes a channel or slot 70, for enabling slidable motion of a member disposed therein along the guide member 64. A frame member 72 having a recess 74 is slidably mounted with respect to the base member 58, by means of brackets 76 disposed in the channel 70 of the respective guide members 64. A pair of motor means 80 and 82 are mounted by suitable means in the recess 74 of frame member 72. The shafts 84 and 86 of the motor means 80 and 82 respectively, extend through the top portion 88 of the frame member 72 for engaging and supporting a cartridge assembly 6. Motor means 80 and 82 are energized from the electrical unit 40 by means of extendable cables 90 and 92.

The cartridge assembly 6 includes a pair of substantially coplanar web or tape reels 94 and 96. The free ends of the recording web 4 are secured about the respective reels 94 and 96, with the web 4 extending about a pair of guides 98. The guides 98 may be rotatably mounted rollers of a resilient material as shown, or comprise a pair of resiliently mounted pressure pads. The web 4 with the guide 98 and reels 94 and 96 are completely enclosed, by a plurality of substantially planar fixed sides or walls 100 and a movable side or wall 102 which together form a complete enclosure thereabout. The reels 94 and 96 are rotatably mounted, by suitable means not shown, between a top side 104 and a bottom side 106 of the plurality of fixed sides 100. The movable side wall 102 is secured to top wall 104 by means such as hinges 108. A pair of apertures 110 are provided in the bottom wall 106 to permit the passage of the motor shafts 84 and 86 therethrough, for mounting the cartridge assembly 6 on the frame member 72.

Figure 2:
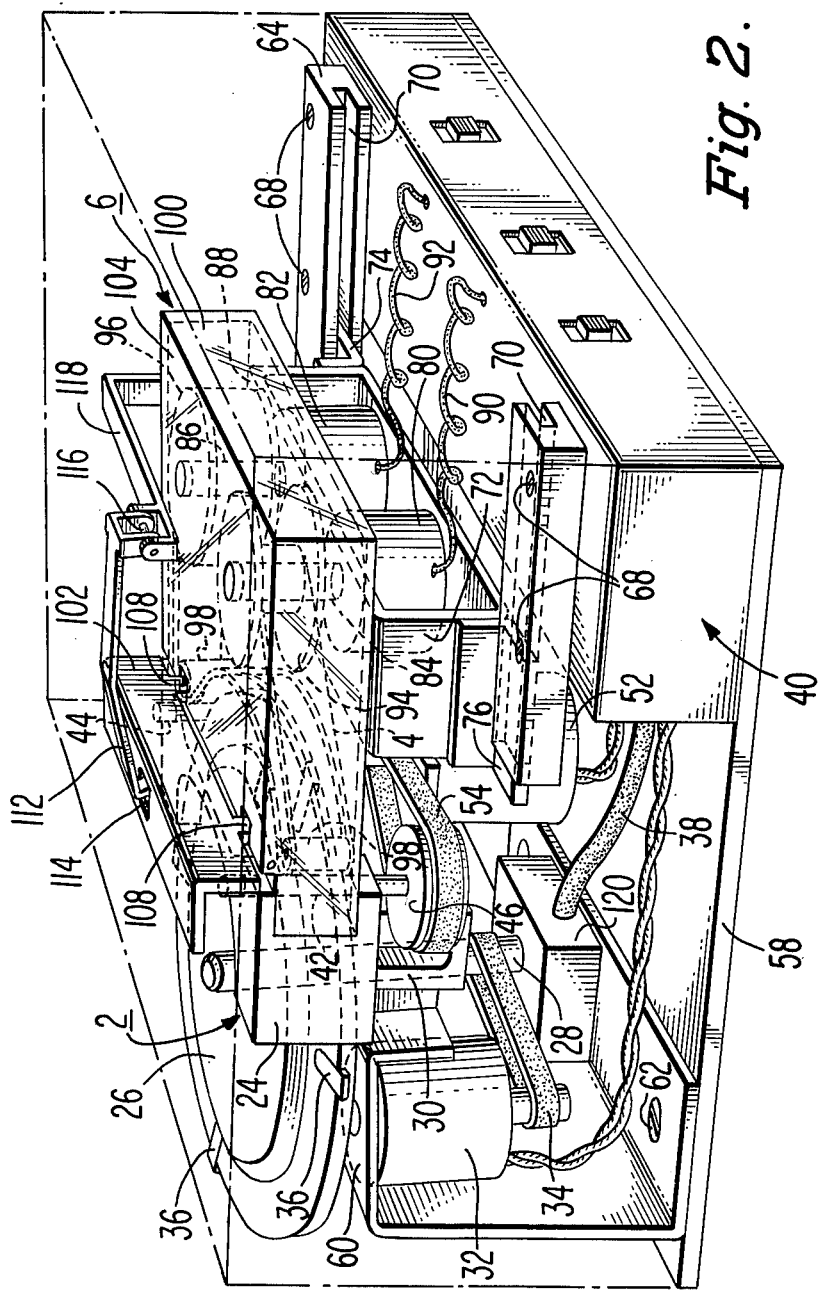
FIG. 2 is a perspective view of the embodiment of FIG. 1, wherein the elements thereof are shown in a further position of an operating sequence.
Figure 3:
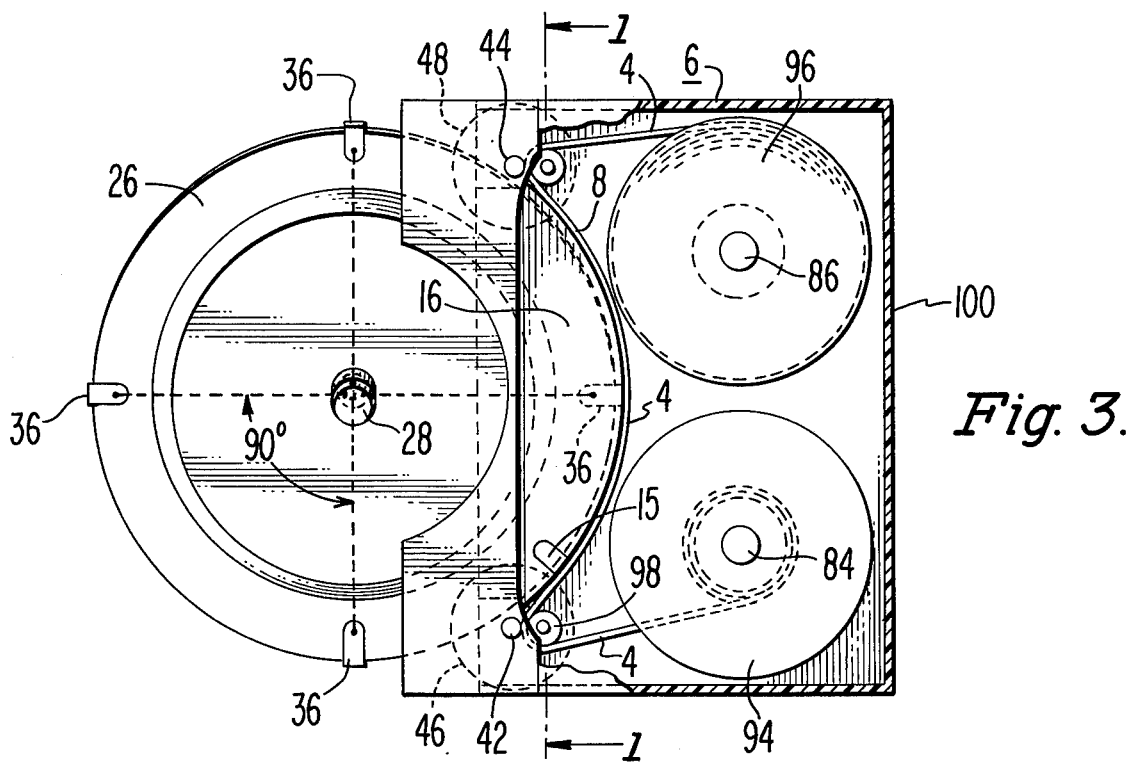
FIG. 3 is a plan view of a portion of the embodiment of FIG. 1.

As shown in FIG. 1, the height A or separation between fixed walls 104 and 106 is made to at least slightly exceed the dimension B between the edges 12 and 14 of the guide surface 8 of the transport scanner assembly 2. In FIG. 1 the system may be considered as disposed in a standby condition, with the cartridge assembly 6 disposed as shown on the slidable frame member 72. When it is desired to transduce information with the recording web 4, the frame member 72 with the cartridge assembly 6 mounted thereon is caused to move, by manual or suitable automatic means not shown, along the channels 70 of the members 64 towards the transport-scanner assembly 2. A finger like member 112 engages a groove or detent 114, which as shown in FIG. 2, is disposed in the movable wall 102 of the cartridge assembly 6. As shown in FIGS. 1 and 2, the member 112 is pivotally mounted, by means such as pin 116, to a stationary bracket 118. In FIGS. 2 through 4 like numbered elements are identical to and correspond with those shown and described with respect to FIG. 1.

As the cartridge assembly 6 continues to move towards the transport-scanner assembly 2, the movable wall 102 is caused to rotate by the member 112 toward the top wall 104 of the cartridge assembly 6. The opening or movement of the wall 102 provides access between the fixed walls 104 and 106 to the interior of the cartridge enclosure 6. Movement of the web cartridge assembly 6 continues, until the cartridge is disposed with respect to the transport-scanner assembly 2 as shown in FIG. 2. It will be understood that suitable latching means not shown, may be provided in known manner for maintaining the cartridge assembly in the position shown in FIG. 2. In the condition illustrated in FIG. 2, the truncated slotted guide surface 8 of the assembly 2 is interleaved between the walls 104 and 106, with the member 98 urging the web 4 into cooperative relation with the respective capstan 42 and 44 of the assembly 2. The interleaved relationship just described may be more clearly observed, from a consideration of the plan view and sectional view of this relationship shown in FIGS. 3 and 4.

As shown in FIGS. 3 and 4, the slotted guide surface 8 with truncating surfaces 16 and 18 extends into the hollow recess within the cartridge 6 adjacent the reels 94 and 96. This insertion of the truncated guide surface 8 within the cartridge 6, causes the recording web 4 to take the form of and be in cooperative relation with the slotted surface 8 of the transport scanner assembly 2. In this condition, the transducers 36 scan the recording web through the slot 10 when the headwheel or disc 26 is rotated. Thus it is seen that with the described arrangement, no threading of the record medium 4 in the transport path is necessary. In addition the record medium 4 need not be removed from its protective cartridge nor exposed for transducing information. Rather the record medium 4 remains and is transported within the recesses of the protective cartridge 6, with the necessary tape guiding and transducer scanning being accomplished within the cartridge.

As more clearly shown in FIG. 3, the extent of the slotted arcuate guide surface 8 may be made approximately equivalent to a 90° arc segment or sector of the headwheel or disc 26, with the four rotatable transducers 36 being spaced substantially at 90° intervals about the periphery of the disc 26. This provides continuous scanning of the portion of the recording web 4 disposed on the guide surface 8. With the arrangement shown and described, the rotation of the transducers 36 through the diagonal slot 10 of the surface 8, produces a series of slant tracks extending diagonally across the recording web 4. It will be understood however that it is within the spirit of the scope of the invention to modify the arcuate extent of the guide surface 8 and provide a corresponding appropriate number of rotatable transducers 36. For example the guide surface 8 may comprise an arcuate portion of approximately 120° with three rotatable transducers located at 120° intervals about the headwheel disc 26.

Also shown more clearly in section in FIG. 4, there are means within the box 120 for feeding signals between the rotatable transducers 36 on the headwheel 26 and the stationary electronic unit 40, which is mounted on the base 58. In FIG. 4 as shown, a series of conductive slip rings 122 are provided about the shaft 28 of the headwheel 26. Each of the slip rings 122 is adapted to couple signals with the corresponding one of transducers 36 on the headwheel 26. Corresponding suitable conductive segments 124 are arranged to maintain contact with the respective ones of the slip rings, as the shaft 28 is rotated. The contacts 124 may be coupled as shown by any suitable wiring to the electrical unit 40 on the base 58.

Figure 5:
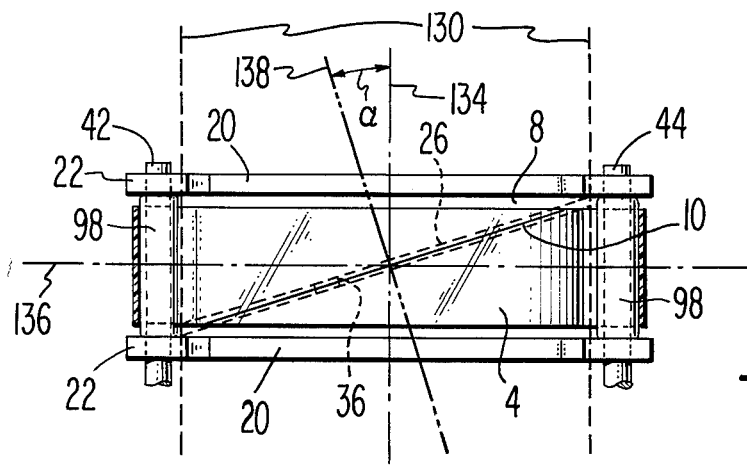
FIGS. 5 and 6 are front views of a portion of the arrangement shown in FIG. 1.
Figure 6:
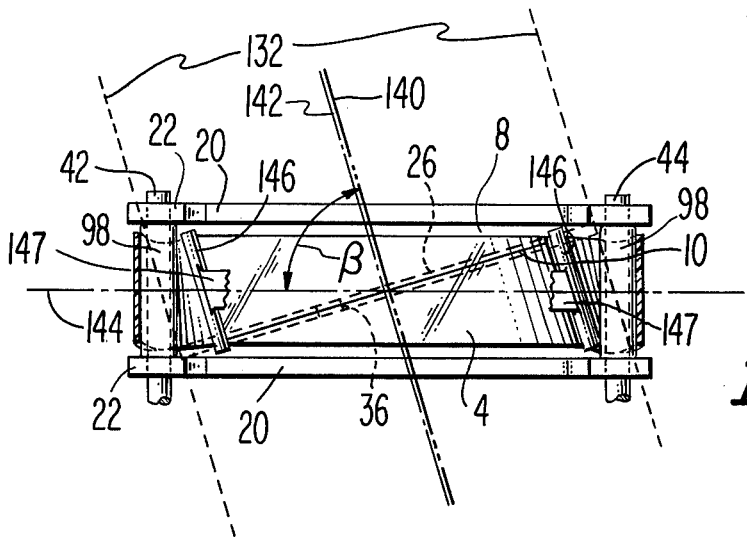

Further with regard to the arcuate web guide surface of the transport scanner assembly 2, there is illustrated in the front view of FIGS. 5 and 6, further details of two arrangements for the arcuate guide surface 8 of the transport scanner assembly 2. In FIGS. 5 and 6 like numbered elements correspond with those shown and described with respect to FIGS. 1 through 4. In both FIGS. 5 and 6 the guide surface 8 is the peripheral surface of a sector or segment of a cylinder, indicated by the dashed lines 130 and 132 in the respective FIGS. 5 and 6. In FIG. 5 the axis 134 of the cylinder 130 is substantially normal to the center line 136 of the moving web 4, and at an angle with respect to the axis 138 of the headwheel 26. In FIG. 6 the axis 140 of the arcuate surface 8 of cylinder 132 is substantially parallel with the headwheel axis 142, and forms an angle $\beta$ with the center line axis 144 of the moving web 4.

Figures 7, 8:
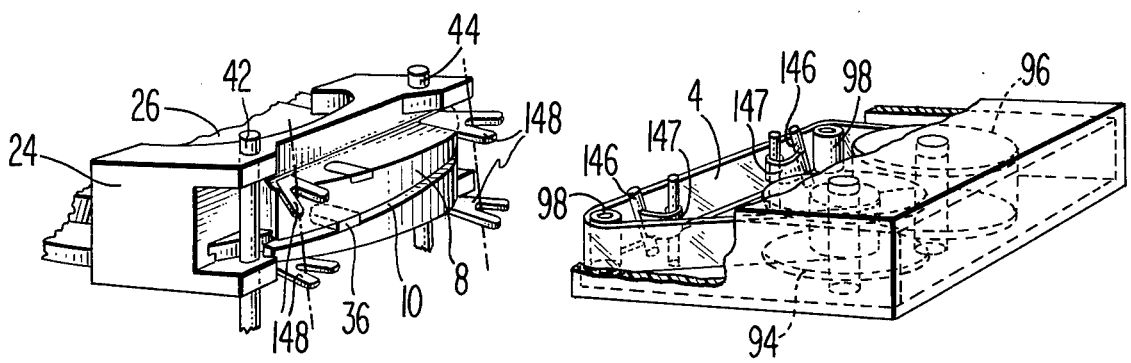
FIGS. 7 and 8 are perspective views illustrating details of a guiding arrangement for the recording web of FIG. 1.

In the arrangement of FIG. 6, because of the angle $\beta$ between the axis 140 of the cylinder and the center line axis 144 of the web 4, a pair of further guide members 146 are preferably provided to guide the moving web 4 between the guides 98 over the arcuate surface 8. In one arrangement, the guide members 146 comprise one or a number of non-rotatable pins or rods. As shown in FIG. 7, the guide members 146 are mounted within the cartridge assembly 6, on the side opposite the side of the web 4 which cooperates with the arcuate guide surface 8. The guide members 146 are floatably mounted to the cartridge 6, by means such as resilient leaf springs 147 secured to the ends thereof permitting angular movement of the guide members 146. Locating means, such as the bifurcated members 148, can be secured to the transport scanner assembly such as shown in FIG. 8. When the cartridge assembly 6 is disposed in cooperative relation with the transport-scanner assembly 2, the pairs of members 148 engage the guide means 146, to dispose them in desired orientation with respect to the arcuate guide surface 8.

What is claimed is:

1. A system for use with a cartridge having walls for enclosing a pair of web storage means and a web disposed therebetween which includes means for providing movably mounted web guide means, said system being of the type in which trnsducer means scan through an arcuate guide surface which is introduced between said walls into said cartridge for cooperation with said web, comprising: support means mounting said guide surface in cantilevered manner with said guide surface situated in distal manner away from said support means, said support means including given portions in juxtaposed relation with the ends of the arcuate portion of said guide surface, a pair of rotatable web moving means, means mounting said web morving means to said given portions for cooperation with a portion of said web disposed between said storage means when said scanner means is within said cartridge, and means on said support means arranged to coact with said movable web guide means of said cartridge to establish a desired angular orientation between said web guide means and said guide surface when said web is disposed in cooperative relation with said arcuate guide surface.

2. A system for transducing information from an elongated record web moved between a pair of web storage means rotatably mounted between first and second opposite walls of a web cartridge which encloses said storage means and said web, said cartridge including means for providing movably mounted web guide means disposed between said web and said storage means, comprising: a support member including an arcuate web guide surface member dimensioned to pass between said first and second walls into said cartridge, the axis of said arcuate guide surface member being angled with respect to said web movement and having a transducer means therein for coaction with said web, said arcuate guide surface member being positioned to permit disposition of said cartridge with said arcuate surface interposed between said first and second wall and extending into said cartridge in cooperative relation with said web between said storage means, and means associated with said support member arranged to coact with said movable web guide means of said cartridge to establish a desired angular orientation between said mounted web guide means and said guide surface when said web is disposed in cooperative relation with said arcuate guide surface.

3. The invention according to claim 2, wherein said system includes apparatus cooperating with a web cartridge having at least one elongated pin for non-rotational web guiding cooperation with said web on said guide surface, said elongated pin guide being mounted to said cartridge in a manner to permit variation of the angular disposition of said elongated pin with respect to said web and said guide surface, comprising: stationary holding means coupled to said support member in predetermined spacial relation to said guide surface, said holding means including surface means engaging said cartridge web guide pin to establish said given angular position of said pin with respect to said guide surface.

4. The invention according to claim 2, wherein said support member includes given portions adjacent the ends of said arcuate web guide surface, a pair of rotatable web moving means, and means mounting said web moving means to said given support portions.

5. A cartridge with an elongated record web for use with a system for transducing information from said web, said system including a protruding arcuate web guide surface member having a movable transducer for coaction with said web, comprising: a pair of web storage means mounted in substantially co-planar spaced relation between first and second walls, said first and second walls in conjunction with further walls defining an enclosure for said storage means and said web, means movably mounting one of said further walls to said enclosure to provide access to the interior of said enclosure, said first and second walls being spaced apart to permit entrance of said web guide surface member into said enclosure for cooperation with said web when disposed between said storage means, further guide means for guiding said web with respect to said arcuate surface member, and means movably mounting said further guide means within said enclosure for angular displacement with respect to said arcuate guide surface.

6. The invention according to claim 5, wherein said further guide means includes at least one elongted pin for non-rotational guiding cooperation with said web, and means coupling said pin to said enclosure to provide free angular movement of said pin with respect to said web disposed between said storage means.

7. In a cartridge for use with a system in which transducer means scan a helical section guide surface whose central axis is angled with respect to the major dimension of said cartridge and which transducer means is introduced into said cartridge for transducing information from a record web disposed between web storage reels within said cartridge, apparatus for maintaining said web in desired spacial relation with respect to said guide surface, comprising: web guide means within said cartridge between said reels and said web, and mounting means coupling said guide means to said cartridge in movable manner to render said guide means displaceable in at least two dimensions with respect to said guide surface.

8. The invention according to claim 7, wherein said movably mounted web guide means comprises at least one elongted pin for non-rotational guiding cooperation with said web.

9. Apparatus for transducing signal information with an elongated record web of given width during transport of said web disposed between a pair of web handling reels, said reels being rotatably mounted in substantially coplanar relation between first and second walls adjoining the ends of said reels, said first and second walls being substantially parallel and transverse of the rotation axis of said reels, the boundaries of said first and second walls in conjunction with further walls defining a cartridge which completely encloses said web and said reels, at least one of said further walls being movably mounted to said cartridge to provide access means to the interior of said cartridge enclosure through the area between said first and second walls closed by said movable wall, comprising:
 a base member;
 first means adapted to receive and support said web cartridge;
 truncated transducer scanner means including an arcuate web guide surface having an elongated slot therein extending diagonally across said surface with at least one transducer mounted for rotation in said slot, said guide surface having a dimension transverse of said arc which is no less than said given width of said web but is less than the distance between said first and second walls of said web cartridge enclosure;
 means mounting said transducer scanner means and said first means to said base member for relative movement thereof between first and further positions, said means when in said first position disposing said web cartridge in spaced relation with said transducer scanner means and when in said further position said truncated scanner means is interposed between said first and second walls of said cartridge with said arcuate guide surface extending within the areas intermediate said first and second walls for intercepting the portion of said web disposed between said reels;
 said transducer scanner means including projections adjacent each end of said arcuate guide surface, first and second rotatable capstan web driving members, and means respectively mounting said capstan members to said projections; and
 means adapted to engage said movable cartridge wall, said movable wall engaging means including a generally finger-like mechanical member adapted to engage a major surface portion of said movable wall, and support means for disposing said mechanical member between said first means and said scanner means when said first means is in its first position.

10. The invention according to claim 9, wherein said mechanical member has a generally hooked shaped configuration and means mounting said hook member for rotation in accordance with movement of said first means between said first and further positions.

11. Apparatus for transducing signal information on an elongated magnetic tape of given width during transport of said tape between a pair of coplanar reels rotatably mounted in a cartridge, said tape following a path from one reel to the other adjacent a wall of said cartridge, access to the interior of said cartridge being through said wall of said cartridge comprising:

> means for providing first and second movably mounted tape guide means disposed along said tape path, said tape guide means each including a first movably mounted guide pin normal to the longitudinal axis of said tape and a second movably mounted guide pin inclined to the longitudinal axis of said tape;
>
> first means adapted to receive and support said cartridge;
>
> an arcuate tape guiding surface mounted in a cantilever manner in said apparatus and of a dimension to be received into said cartridge through said wall to guide said tape from one reel past said first and second tape guide means to the other within the confines of said cartridge, said tape guiding surface defined by a portion of the surface of a circular cylinder having an axis inclined at an acute angle from vertical and truncated in the horizontal direction and having an elongated slot therein extending diagonally across said surface;
>
> a headwheel carrying a transducer mounted for rotation in said slot;
>
> means mounting said first means for relative movement between a first position disposing said cartridge in spaced relation with said tape guiding surface and a second position wherein said tape guiding surface is adapted to extend into said cartridge; and
>
> said arcuate tape guiding means further including guide pin locating means mounted thereon for disposing said inclined tape guiding pins in a desired orientation with respect to the arcuate tape guiding surface when said surface is extended into said cartridge.

12. Apparatus providing for helical scanning of a magnetic tape within a tape cartridge, said cartridge including two spaced-apart coplanar tape reels, at least two first tape guide members having their longitudinal axes disposed parallel to the axes of rotation of said reels for guiding said tape between said reels and at means providing least two floatably mounted second tape guide members having their longitudinal axes disposed at an angle to said axes of rotation of said reels, comprising:

> a transport scanner assembly including tape scanning means disposed for rotation within a portion of a cylindrical housing including an arcuate exterior guide surface portion, said housing and tape scanning means being disposed at a predetermined angle to said axes of rotation of said reels when said housing is disposed within said cartridge in operating relationship; and
>
> guide member locating means attached to said housing for engaging said second tape guide members of said cartridge for fixedly retaining same at said predetermined angle when said housing and said cartridge are positioned in said operating relationship for accurately placing said tape in contact with said arcuate surface.

* * * * *

UNITED STATES PATENT OFFICE
CERTIFICATE OF CORRECTION

PATENT NO. : 4,025,959
DATED : May 24, 1977
INVENTOR(S) : Henry Ray Warren

It is certified that error appears in the above-identified patent and that said Letters Patent are hereby corrected as shown below:

Column 2, Line 9 - change "nnot unnecesarily" to -- not unnecessarily -- ;

Column 2, Line 16 - change "transducer" to -- transducers -- ;

Column 2, Line 30 - change "problem" to -- problems -- ;

Column 3, Line 26 - change "reporducer" to -- reproducer -- ;

Column 3, Line 41 - change "achieved" to -- advanced -- ;

Column 5, Line 16 - change "member" to -- members -- ;

Column 5, Line 67 - after "of" insert -- the -- ;

Column 6, Line 17 - after "angle" insert -- α -- ;

Column 6, Line 48 - change "trnsducer" to -- transducer -- ;

Column 6, Line 57 - change "morving" to -- moving -- ; and

Column 10, Lines 16 & 17 - change "at means providing least" to -- means providing at least -- .

Signed and Sealed this

Twenty-seventh Day of September 1977

[SEAL]

Attest:

RUTH C. MASON
Attesting Officer

LUTRELLE F. PARKER
Acting Commissioner of Patents and Trademarks